UNITED STATES PATENT OFFICE 2,029,288

PETROLEUM RESIN

Ulric B. Bray, Palos Verdes Estates, Calif., assignor to Union Oil Company of California, Los Angeles, Calif., a corporation of California No Drawing. Application April 19, 1932,
Serial No. 606,277

5 Claims. (Cl. 196—74)

This invention relates to petroleum plastics. More specifically, it relates to petroleum plastics produced from petroleum residuum.

I have discovered that the heavier members of the aromatic portion of cracked residuum are in the nature of plastics which are substantially solid at ordinary temperatures. These plastic bodies are very valuable as binders and, due to their transparency, are suitable to be used for many purposes for which asphalt, owing to its blackness, cannot be adapted.

Most cracked residua contain appreciable quantities of these plastic or resinous bodies, however, I have found that cracked residuum produced by recycling gas oil or other petroleum fractions through a hydrocarbon conversion process is especially valuable as a source of these materials and cracked residuum which has been produced by recycling aromatic gas oil or the sulphur dioxide soluble fractions of petroleum through a hydrocarbon conversion process is still more preferable as it contains a greater quantity of these valuable plastics or resins than most other petroleum fractions. A very suitable cracked residue is produced by recycling a gas oil of approximately 29.0° A. P. I. gravity at 60° F. through a Cross cracking process at a maximum pressure of 800 pounds and a maximum temperature of 880° F. The residuum obtained as a bottoms from the flashing drum in which the gasoline and cycle stock were removed by distillation contains an appreciable quantity of the valuable resins. This cracked residue has a specific gravity of about 1.060 at 60° F. and a viscosity of approximately 87 seconds (Saybolt furol at 122° F.).

In the production of these plastics or resins from cracked residuum, I first prepare a hard residue or pitch. This is accomplished by distilling the cracked residuum with fire and steam to a point where the residue remaining in the still has a melting point (Ball and Ring) of approximately 275 to 300° F. I then continue the distillation by the aid of steam or vacuum, or both, and collect the high boiling point fractions vaporized from the high melting point pitch. This last overhead fraction obtained from the hard pitch contains gummy or resinous bodies which make it very valuable as a plastic or binder. The resinous materials distilling overhead may be collected in successive cuts of increasing melting point or may be collected together and subsequently reduced with steam or vacuum to the desired melting point or penetration.

As an alternate method of producing these novel plastics or resins, I may first separate the cracked residuum into fractions by a solvent, such as naphtha, which has a high solubility coefficient for the oily and viscous materials present but has a low solvent power for the carbonaceous materials present. The fractions dissolved in the solvent are then separated from the solvent by ordinary fractional distillation methods and the distillation continued to remove the middle oils until the residue has the degree of plasticity desired. If a lighter color is desired than corresponds to the residue obtained on distilling the extracted materials, the distillation may be continued to a point where the plastic residues are thrown overhead.

As an alternate method of separation of the resinous or plastic materials, the dissolved fraction discussed in the preceding paragraph may be treated with a solvent having a selective action on the aromatics. By separating the less aromatic fractions from the more aromatic fractions I am able to concentrate the plastic bodies in the aromatic fraction and thereby reduce the quantity of oily material which has to be distilled overhead preceding the vaporization and recovery of the plastic or resinous bodies. As solvents which will separate the more aromatic from the less aromatic fractions I find liquid sulphur dioxide, aniline, nitrobenzene and furfural to be useful. Liquid sulphur dioxide is especially useful as it has a great affinity for the more aromatic fractions present in the cracked residuum. The methods of employing these solvents to separate oil into more aromatic and less aromatic fractions is well known to the art, and, therefore, will not be discussed here.

I may also produce these plastics by extracting cracked residuum with naphtha or liquid propane to separate the oily fractions from the asphaltic and carbonaceous bodies present. The oily fractions dissolved in the solvent may then be recovered by distillation. The extract so produced may then be re-extracted with a second solvent capable of separating the more aromatic fractions present from the less aromatic fractions as previously described. The more aromatic fraction is then separated from the second solvent and then reduced to a plastic by distilling off the light oily, non-viscous constituents present.

These resins are characterized by very high specific gravities, low penetrations at ordinary temperatures for a given melting point, complete solubility in petroleum or coal tar solvent naphthas, greenish brown colors by reflected light and amber color when viewed in thin films by transmitted light. They are further characterized by unusually great adhesive properties.

In the selection of petroleum or petroleum fractions from which to produce my new plastic or resin, I find it desirable to choose a stock which is comparatively free from paraffin or wax as these materials tend to distill over into the finished plastic or resin and injure its binding properties.

It is, therefore, an object of my invention to produce plastics or resins from petroleum.

It is another object of my invention to produce plastics or resins from petroleum or petroleum fractions which are highly aromatic in character.

It is another object of my invention to produce plastics or resins from cracked residua by first distilling the residua to a hard pitch or residue and then collecting the high boiling point plastics or resins which are vaporized upon further distillation.

It is still another object of my invention to separate the more aromatic fractions from petroleum or petroleum fractions by the use of solvents, distill the oily bodies away from the heavy aromatic residue and then vaporize and recover the plastics or resins present in the heavy aromatic residue.

As I have already pointed out, the resins or plastics produced by my process are transparent or translucent and possess a light amber color when viewed in thin films by transmitted light. These plastics or resins may be mixed with colored aggregate or pigments in the construction of sidewalks, walk ways, street markers or road beds. By heating the plastic or resin sufficiently a fluid mass is obtained which, upon application to a bed composed of colored aggregate or stone, spreads evenly over the surface and penetrates throughout the rock or aggregate voids. Upon cooling the plastic stiffens and functions as a binder for the individual aggregate particles and at the same time produces a tough wearing surface. Where better contrast is desired for the colored aggregate or pigment, I find it highly desirable to mix a white substance, such as lithopone or zinc oxide with the molten plastic or resin and then blend this mixture with colored aggregate or pigment.

My new resin or plastic may also be used in the form of an emulsion. For example, the molten plastic may be emulsified in water with such stabilizing agents as soaps or clay and the emulsion so formed may be directly applied to surfaces where a high degree of transparency is desired or it may also be applied to a bed of colored aggregate or mixed with colored pigments and spread upon surfaces where a colored effect is desired.

My new resin or plastic may also be used as a constituent or base for varnishes, paints and lacquers. By choosing the distillation conditions so as to obtain a melting point of 150° F. on the plastic, I find that this plastic can be converted into a serviceable varnish or metal lacquer by cutting with a volatile solvent, such as a petroleum fraction having a boiling range of 230 to 350° F. Pigments may be ground into the cutback plastic to obtain an enamel. The plastic is compatible to a certain degree with oils, paints and synthetic resin lacquers, so that it may be used to advantage in many paint and lacquer formulae. When used as a plasticizer in various formulae, the exact melting point of the petroleum resin or plastic is best determined by experimentation with the other components and in view of the service for which the lacquer or paint is intended.

Furthermore, I may utilize the high melting point cracked pitch as a coating material without distilling the plastic bodies away from the carbonaceous and asphaltic bodies present. This high melting point material has the tenacity of a premium binder. Protective paint coating or metal primer may be produced from this hard pitch by dissolving it in an aromatic solvent such as xylene or the liquid sulphur dioxide soluble portion of a petroleum fraction commonly known as "Edeleanu extract" and which has a boiling point range between 300 and 420° F. In producing this new metal coating or primer I find it advantageous to produce a pitch having a melting point of 150 to 250° F. (Ball and Ring) from the cracked residuum previously described and then dissolve the pitch so produced in one of the foregoing solvents. It is believed that the cracked residuum pitch consists essentially of the resins disclosed above and bituminous and/or carbon particles in colloidal suspension. Due to the opacity of the carbon particles, the resins are protected from the destructive action of the ultra violet light in the same manner as lamp black or carbon black functions in protective paints, while the unusual ability of the resins to adhere to metal surfaces combines to give a protective coating of unusually great efficiency.

The resin or plastic as it is recovered from the pitch is sufficiently transparent for most uses without further refinement. When further purification is necessary I find that a mild acid treatment of the resin dissolved in a volatile solvent will remove the major portion of the dark bodies present. Treatment with large quantities of acid is to be avoided because of the loss of the resin in the form of sludge due to the highly reactive nature of this product. The resin or plastic is dissolved in a low boiling point diluent, such as naphtha or gasoline, after which it is treated with sulphuric acid (about 10 pounds of acid to each 42 gallons of resin). The acid is added to the diluted resin in one or more portions. After each addition of acid the mass is thoroughly agitated and then allowed to remain in a quiescent state in order to settle out the sludge. After the settlement period the sludge is removed and the diluted solution of acid treated resin is then washed with water, alkalized with caustic soda and then rewashed until neutral. The neutral solution of resin is then recovered by distilling off the diluent.

Other purification means may also be used to increase the transparency of the plastic. For example, it may be clay treated at an elevated temperature and then filtered to recover the refined plastic from the spent clay and adsorbed products. Furthermore, the plastic may be purified by the hypochlorite process. In this treatment the plastic is dissolved in a low boiling point diluent, such as gasoline, after which a solution of calcium or sodium hypochlorite is added and the mixture of diluted resin and sodium hypochlorite solution is thoroughly agitated. The hypochlorite solution is then allowed to settle out and is withdrawn from the diluted plastic. The diluted plastic is then washed thoroughly with a caustic soda solution after which it is washed with water until neutral. The plastic is then recovered by distilling off the diluent present.

For extremely light colored plastics, I may redistill the products of the first distillation as many times as is necessary, with or without intermediate chemical treatment. The overhead cuts may be combined or segregated into plastics of different melting points.

If desired the acid treatment or the treatment with hypochlorite or redistillation, all of which I have described, may be followed by treatment with clay, however, in most instances I find this additional purification to be unnecessary. Most decolorizing clays are suitable for refining the plastic. For example, I may use Florida earth, Death Valley clay, bentonite, frankonite or fuller's earth and obtain satisfactory purification.

As an example of the preferred method of producing the plastic I take a cracked residuum produced by recycling an aromatic gas oil in a hydrocarbon conversion process and distill off the oily fractions present until a hard pitch or residue remains on the still having a melting point (Ball and Ring) of 275° F. This high melting point pitch or residue is then subjected to further distillation with aid of steam or vacuum or both and the fractions vaporized from the high melting point pitch or residue are recovered in the form of the new plastic or resin. The yield of plastic in many cases will be from 10 to 15% of the volume of cracked residuum used. The plastic obtained may be further purified if desired by any of the processes which I have described and which have been found satisfactory in removing the color bodies present in the plastic.

The following table shows the specific gravity melting point, viscosity at 210° F., ductility and penetration of four representative samples of the new plastic:

| Sample | Specific gravity at 60° F. | Melting point (B. & R.) °F. | Viscosity seconds Saybolt furol at 210° F. | Ductility at 77° F. | Penetration at 77° F. (100 grams for 5 seconds) |
|---|---|---|---|---|---|
| 1 | 1.084 | 93 | 44 | 100+cm. | 198 |
| 2 | 1.102 | 114 | 106 | 100+cm. | 40 |
| 3 | 1.107 | 131 | 276 | 100+cm. | 7 |
| 4 | 1.126 | 145 | 600 | | 0 |

When I use the term "pitch" I mean to indicate a heavy residue which has not been distilled overhead.

It is to be understood that the foregoing examples are merely illustrative and must not be construed as limiting the invention which I claim, as many modifications will appear to those skilled in the art.

I claim:

1. A process for the production of plastic resins from petroleum which comprises distilling a cracked residue to a pitch and then distilling said pitch to isolate as a distillate a plastic resin having a specific gravity between approximately 1.084 and 1.126, a melting point between approximately 93–150° F. and a ductility at 77° F. in excess of 100 cm.

2. A process for the production of plastic resins from petroleum which comprises distilling a cracked residuum to a pitch having a melting point of about 300° F. and then distilling said pitch to isolate as a distillate a plastic resin having a specific gravity between approximately 1.084 and 1.126, a melting point between approximately 93–150° F. and a ductility at 77° F. in excess of 100 cm.

3. A process for the production of plastic resins from petroleum which comprises separating a cracked residuum into fractions by means of a solvent having a low solvent power for the asphaltic materials present in said residuum, separating asphaltic materials from the cracked residuum fractions dissolved in the solvent, removing solvent from the dissolved fractions and distilling said fractions to obtain as a distillate a plastic resin having a specific gravity of about 1.084 to 1.126, a melting point between 93–150° F. and a ductility at 77° F. in excess of 100 cm.

4. A process for the production of plastic resins from petroleum which comprises separating a cracked residuum into fractions by means of a solvent having a low solvent power for the asphaltic materials present in said residuum, separating asphaltic materials from the cracked residuum fractions dissolved in the solvent, extracting the dissolved cracked residuum fractions with a selective solvent for the more aromatic fractions, removing aromatic fractions dissolved in the said selective solvent and distilling said fractions to produce as a distillate a plastic resin having a specific gravity of about 1.084 to 1.126, a melting point between approximately 93° F. and 150° F. and a ductility at 77° F. in excess of 100 cm.

5. A petroleum plastic resin substantially free from asphaltic materials having a specific gravity of about 1.084 to 1.126, a melting point between 93° F. and 150° F. and a ductility of greater than 100 cm. at 77° F. and being substantially solid at ordinary temperatures.

ULRIC B. BRAY.